US010774510B2

(12) United States Patent
Braddock et al.

(10) Patent No.: US 10,774,510 B2
(45) Date of Patent: *Sep. 15, 2020

(54) OVERFLOW SYSTEM FOR A FLUID CONTAINER

(71) Applicant: MAAX BATH INC., Lachine (CA)

(72) Inventors: Charles Kerwin Braddock, Ellicott City, MD (US); Thomas Stuart Debaugh, Glen Rock, PA (US); Ashley Imsand, Huntersville, NC (US)

(73) Assignee: MAAX BATH INC., Lachine (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/611,870

(22) Filed: Jun. 2, 2017

(65) Prior Publication Data

US 2017/0350107 A1 Dec. 7, 2017

Related U.S. Application Data

(60) Provisional application No. 62/345,493, filed on Jun. 3, 2016.

(51) Int. Cl.

| *E03C 1/242* | (2006.01) |
| *G01F 23/22* | (2006.01) |
| *A47K 3/00* | (2006.01) |
| *G05D 9/12* | (2006.01) |
| *E03C 1/24* | (2006.01) |

(52) U.S. Cl.
CPC ............. *E03C 1/242* (2013.01); *A47K 3/001* (2013.01); *G01F 23/22* (2013.01); *G05D 9/12* (2013.01); *E03C 2001/2406* (2013.01)

(58) Field of Classification Search
CPC . E03C 1/242; E03C 2001/2406; A47K 3/001; G05D 9/12
USPC .............................. 4/427, 672, 674, 668, 626
See application file for complete search history.

(56) References Cited

U.S. PATENT DOCUMENTS

| 4,042,984 | A | * | 8/1977 | Butler | ..................... E03C 1/242 |
| | | | | | 137/624.11 |
| 4,563,780 | A | * | 1/1986 | Pollack | ................... E03C 1/055 |
| | | | | | 137/392 |
| 4,685,158 | A | * | 8/1987 | Lively | ...................... G05D 9/12 |
| | | | | | 4/508 |
| 5,855,356 | A | | 1/1999 | Fait | |
| 5,975,124 | A | * | 11/1999 | Stevens, II | ................ E03C 1/05 |
| | | | | | 134/113 |
| 7,096,522 | B2 | * | 8/2006 | Hirtriter | .................... E03C 1/24 |
| | | | | | 4/668 |
| 7,350,245 | B2 | * | 4/2008 | Giagni | ..................... G05D 9/12 |
| | | | | | 4/623 |

(Continued)

FOREIGN PATENT DOCUMENTS

| CA | 2 265 374 A1 | 9/1999 |
| CN | 204826095 U | 12/2015 |

(Continued)

*Primary Examiner* — Tuan N Nguyen
(74) *Attorney, Agent, or Firm* — Bradley Arant Boult Cummings; Phillip E. Walker; Timothy L. Capria

(57) ABSTRACT

An overflow system for determining a level of a liquid to be contained in a container, which comprises a body extending along a longitudinal axis, the body being insertable within the container; and a level sensor unit secured to the body for detecting the level of the liquid along the longitudinal axis of the body.

20 Claims, 8 Drawing Sheets

(56) References Cited

U.S. PATENT DOCUMENTS

| | | | |
|---|---|---|---|
| 7,451,502 B2 * | 11/2008 | Ball | E03C 1/242 |
| | | | 4/668 |
| 8,146,181 B2 | 4/2012 | Gaus | |
| 9,783,964 B2 | 10/2017 | Thompson et al. | |
| 9,945,103 B2 | 4/2018 | Thompson et al. | |
| 2002/0047784 A1 * | 4/2002 | Dunnett | E03C 1/24 |
| | | | 340/618 |
| 2002/0148040 A1 * | 10/2002 | Mateina | E03C 1/05 |
| | | | 4/675 |
| 2005/0060796 A1 | 3/2005 | Cho | |
| 2008/0163416 A1 * | 7/2008 | Go | E03C 1/055 |
| | | | 4/559 |
| 2009/0050209 A1 | 2/2009 | Rautavuori et al. | |
| 2009/0178192 A1 | 7/2009 | Vassilev | |
| 2012/0318386 A1 | 12/2012 | Guzman | |
| 2015/0276075 A1 | 10/2015 | Davies | |
| 2016/0258144 A1 | 9/2016 | Tayenaka et al. | |
| 2017/0348481 A1 * | 12/2017 | Braddock | A47K 3/001 |

FOREIGN PATENT DOCUMENTS

| | | | | |
|---|---|---|---|---|
| EP | 2 918 739 B1 | 9/2018 | | |
| GB | 2413424 A | * 10/2005 | | A47K 3/001 |
| JP | 2008-008124 A | 1/2008 | | |

* cited by examiner

OVERFLOW SYSTEM FOR A FLUID CONTAINER

TECHNICAL FIELD

The present invention relates to the field of apparatuses for determining a level of liquid contained in a container, and more particularly to overflow system for a fluid container.

BACKGROUND

In order to provide automated liquid delivery systems such as automated bathtubs, the control of the level of water within the container is important in order to avoid overflow. While some containers such as bathtubs are usually provided with an overflow aperture connected to an overflow drain for evacuating water when the level of water within the bathtub reaches a predefined height, such an overflow system may not be efficient to avoid overflows.

Therefore, in the context of automated liquid delivery systems, there is a need for an overflow sensor system that automatically monitors the level of liquid contained within a container.

SUMMARY

According to a broad aspect, there is provided an apparatus for determining a level of a liquid to be contained in a container, comprising: a body extending along a longitudinal axis, the body being insertable within the container; and a level sensor unit secured to the body for detecting the level of the liquid along the longitudinal axis of the body.

In one embodiment, the level sensor comprises at least one liquid sensor each positioned at a respective position along the longitudinal axis, each respective position corresponding to a different level of liquid and each liquid sensor for detecting a presence of the liquid.

In one embodiment, the level sensor comprises at least one current source, an electrical circuit and at least one current sensor for measuring at least one current intensity, the electrical circuit comprising at least one input electrical conductor and at least one output electrical conductor, each input electrical conductor being inserted into the body, having a first terminal connected to the at least one current source and a second terminal emerging from the body at one of the respective positions along the longitudinal axis, at least one section of the output electrical conductor emerging body each adjacent to the second terminal of a respective one of the at least one input electrical conductor.

In one embodiment, each second terminal and at least one output electrical conductor form together a respective electrical switch that is open when no liquid is present between the second terminal and the at least one output electrical conductor and that is closed when liquid is present between the second terminal and the at least one output electrical conductor.

In one embodiment, the apparatus further comprises a control unit for determining the level of liquid using a current intensity measured by the at least one current sensor.

In one embodiment, the at least one output electrical conductor comprises a single electrical conductor and the at least one current sensor comprises a single current sensor.

In one embodiment, the control unit is adapted to compare a current intensity measured by the single current sensor to one of at least one predefined intensity and at least one predefined intensity range, and determine the level of liquid based on the comparison.

In one embodiment, the apparatus further comprises a communication unit connected to the control unit.

In one embodiment, the communication unit is a wireless communication unit.

In one embodiment, the control unit is adapted to transmit a signal indicative of the determined level of liquid via the communication unit.

In one embodiment, the control unit is adapted to trigger one of an alert and an alarm upon determining that the determined level of liquid corresponds to a reference level of liquid.

In one embodiment, the reference level of liquid corresponds to an overflow level of liquid.

In one embodiment, upon determining that the determined level of liquid corresponds to the overflow level of liquid, the control unit is adapted to at least one of a first command indicative of a closure for an electronic faucet and a second command indicative of an opening for an electronic drain closure system.

In one embodiment, the apparatus further comprises a temperature sensor emerging form the body for measuring a temperature of the liquid.

In one embodiment, the body is securable to a wall of the container.

In one embodiment, the body comprises an overflow plate securable over an overflow aperture present in the wall of the container.

In one embodiment, the level sensor is secured to a rear face of the overflow plate.

In one embodiment, the body is securable to a faucet secured to the container.

In one embodiment, the container is a bathtub.

BRIEF DESCRIPTION OF THE DRAWINGS

Further features and advantages of the present invention will become apparent from the following detailed description, taken in combination with the appended drawings, in which.

DETAILED DESCRIPTION

Figure 1:
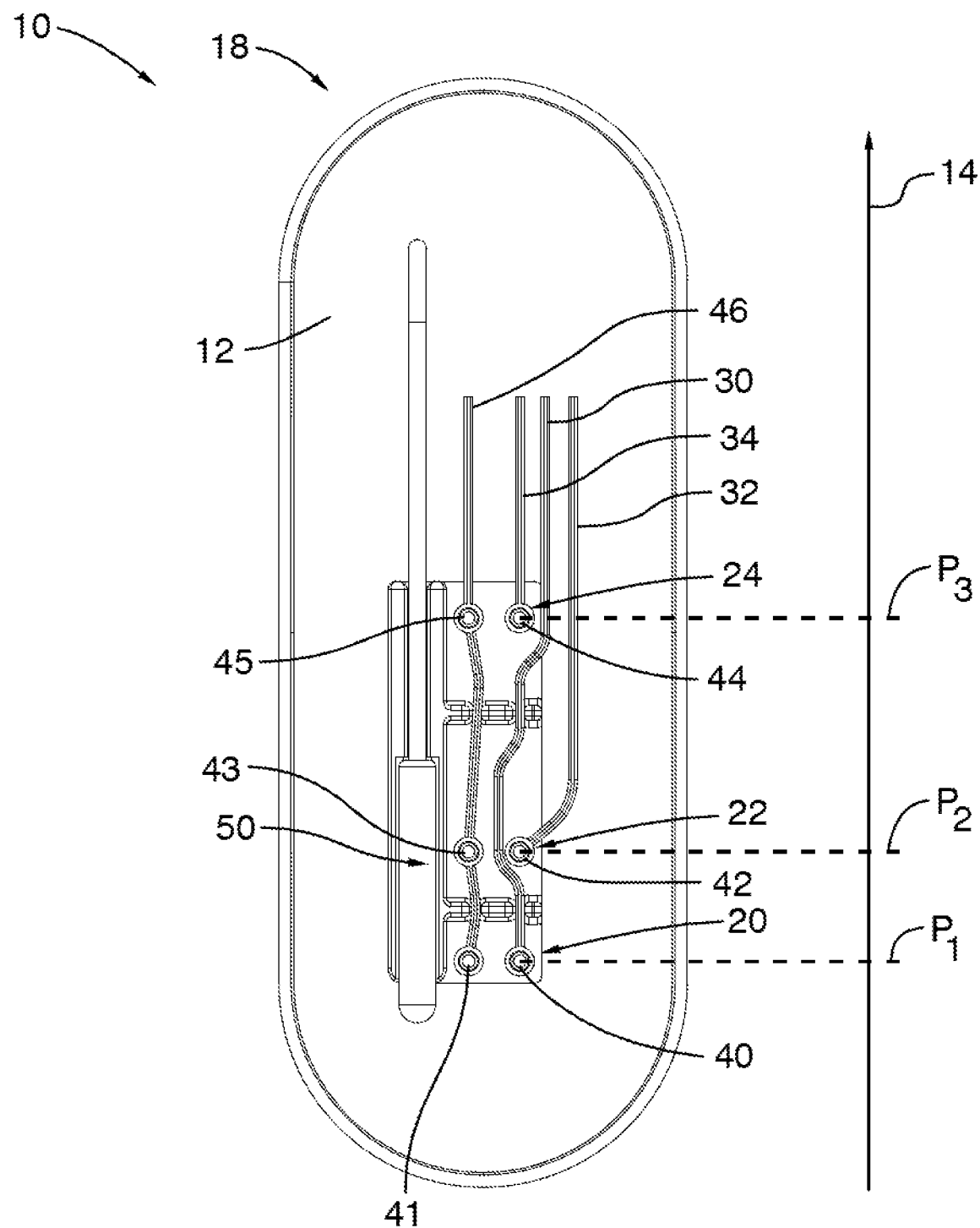
FIG. 1 is a rear view of an apparatus for determining the level of a liquid contained in a container, in accordance with an embodiment.

FIG. 1 illustrates one embodiment of an apparatus 10 for determining the level of liquid contained in a container. The apparatus comprises a body or casing 12 that is securable to the container. The plate 12 extends along a longitudinal axis 14 and has a substantially rectangular shape provided with rounded ends 16 and 18. The apparatus comprises three sensors 20, 22, and 24 each adapted to detect the presence of a liquid at a respective and different position $P_1$, $P_2$ and $P_3$ along the longitudinal axis 14 of the body 12. The plate 12 is secured to the container so that the three sensors 20, 22, and 24 are located at different locations along the height of the container.

The apparatus 10 is secured to the container for which the level of liquid is to be sensed at an adequate position. The apparatus 10 may be positioned so that its longitudinal axis 14 be substantially vertical with the end 16 facing the ground. When the level of liquid contained in the container is below the sensor 20, no sensor 20, 22, 24 detects the presence of liquid. When no sensor 20, 22, 24 detects the presence of liquid, the level of liquid is assumed to be below the position $P_1$. When the level of liquid is between the sensors 20 and 22, the sensors 20 detects the presence of liquid while the sensors 22 and 24 each detect no liquid. When only the sensor 20 detects the presence of liquid, the level of liquid is assumed to be located at or above the position $P_1$ while being located below the position $P_2$. When the level of liquid is between the sensors 22 and 24, the sensors 20 and 22 each detect the presence of liquid while the sensor 24 detects no liquid. When only the sensors 20 and 24 detect the presence of liquid, the level of liquid is assumed to be located at or above the position $P_2$ while being below the position $P_3$. When the level of liquid is above the sensor 24, the three sensors 20, 22 and 24 each detect the presence of liquid. In this case, the level of liquid is assumed to be located at the position $P_3$ or above the position $P_3$.

While the above description refers to three sensors 20, 22 and 24, it should be understood that the number of sensors may vary as long as the apparatus 10 is provided with at least one sensor adapted to detect at least one level of liquid. For example, the apparatus 10 may comprise a single sensor that is adapted to detect a single level of liquid. In another example, the apparatus 10 may comprise a single sensor that is adapted to detect a plurality of levels of liquid.

In one embodiment, the apparatus 10 is used in connection with a bathtub comprising an overflow aperture for evacuating water in order to prevent a water overflow. In this case, the body 12 may correspond to an overflow cover to be secured over the overflow aperture of the bathtub connected to the overflow drain. The position $P_3$ along the longitudinal axis 14 of the body 12 may then be chosen so as to be aligned with the overflow aperture or in the vicinity of the overflow aperture such as just below the bottom of the overflow aperture in the bathtub. The sensor 24 is then used to indicate an overflow of water. The position $P_1$ and $P_2$ may be chosen so as to each correspond to predefined levels of water or volumes of water. For example, the position $P_1$ may correspond to a low level of water within the bathtub while the position $P_2$ may correspond to a high level of water within the bathtub.

In the illustrated embodiment, the sensors 20, 22, 24 each comprise a respective input electrical conductor 30, 32, 34 each having a terminal 40, 42, 44 that emerges from the body 12 so as to be in physical contact with a liquid. It should understood that only the terminal 40, 42, 44 emerges from the body 12 while the remaining of the electrical conductor 30, 32, 34 is inserted within the body so that only the terminal 40, 42, 44 can be in physical contact with the liquid. The terminals 40, 42, 44 are positioned along the longitudinal axis 14 at the positions $P_1$, $P_2$ and $P_3$, respectively. The body 12 further comprises an output electrical conductor 46 that extends longitudinally along the body 12 spaced apart from the terminals 40, 42, 44, and is substantially parallel to the longitudinal axis 14. The electrical conductor 46 is positioned to be adjacent to the terminals 40, 42 and 44. At least three sections 41, 43, 45 of the electrical conductor 46 emerge from the body 12 so as to be in physical contact with water and each of the at least three sections 41, 43, 45 faces a respective terminal 40, 42, 44. The distance between the each terminal 40, 42, 44 and its respective section 41, 43, 45 of the electrical conductor 46 that faces the terminal 40, 42, 44 is chosen as a function of the characteristics of the current injected into the electrical conductor 30, 32, 34 so that at least part of the current may propagate from the terminal 40, 42, 44 and its respective section 41, 43, 45 of the electrical conductor 46 when the terminal 40, 42, 44 and its respective section 41, 43, 45 of the electrical conductor 46 are emerged in water.

In one embodiment, the section 41, 43 or 45 of the output electrical conductor 46 that emerges from the body 12 runs from the position $P_1$ to at least the position $P_3$ along the length of the body 12.

Each terminal 40, 42, 44 and its respective section 41, 43, 45 of the output electrical conductor 46 that faces the terminal 40, 42, 44 forms an electrical switch that is open when no liquid is present between the terminal 40, 42, 44 and its respective section 41, 43, 45 of the output electrical conductor 46 (thereby preventing any current to flow from the terminal 40, 42, 44 and the output electrical conductor 46) and that is closed when liquid is present between the terminal 40, 42, 44 and its respective section 41, 43, 45 of the output electrical conductor 46 (thereby allowing an electrical current to flow from the terminal 40, 42, 44 and the output electrical conductor 46).

The electrical conductors 30, 32, 34 and 46 are part of an electrical circuit that corresponds to a sensing unit for sensing in this case three different levels of liquid, i.e. positions $P_1$, $P_2$ and $P_3$. The electrical circuit comprises at least one current generator for propagating a first electrical current having a first input intensity in the electrical conductor 30, a second electrical current having a second input intensity in the electrical conductor 32, and a third electrical current having a third input intensity in the electrical conductor 34. The electrical circuit further comprises an intensity sensor such as an ammeter for measuring the intensity of the current propagating in the electrical conductor 46. A first predefined intensity or a first predefined intensity range is associated with the first branch of the electrical circuit comprising the electrical conductor 30. A second predefined intensity or a second predefined intensity range (greater than the first predefined intensity or a first predefined intensity range) is associated with the second branch of the electrical circuit comprising the electrical conductor 32. A third predefined intensity or a third predefined intensity range (greater than the first and second predefined intensities or the first and second predefined intensity ranges) is associated with the second branch of the electrical circuit comprising the electrical conductor 32.

It should be understood that the apparatus 10 further comprises a control unit (not shown) for controlling the current generator in order to generate the three electrical currents. The control unit is in communication with the intensity sensor for receiving the measured intensity. The control unit comprises a database on which the first predefined intensity or the first predefined intensity range, the second predefined intensity or the second predefined intensity range and the third predefined intensity or the third predefined intensity range are stored as well as the first, second and third input intensities. The first, second and third intensities may be equal or different. The control unit is configured for comparing the measured intensity to the predefined intensities or the predefined intensity ranges in order to determine the level of liquid, as explained below.

The sensing unit comprising the electrical circuit operates as follows. When the current sensor detects no current, then the control unit determines that the level of liquid is below the position $P_1$. When water is present only between the terminal 40 and the electrical conductor 46, the first electrical current may flow from the terminal 40 to the electrical conductor 46 while no current flows between the terminals 42 and 44 and the electrical conductor 46. The intensity sensor then detects the first electrical current and measures the intensity of the detected current. If the measured intensity substantially corresponds to the first predefined intensity or is contained within the first predefined intensity range, then the control unit determines that the level of water is located at or above the position $P_1$ while being located below the position $P_2$.

When water is present between the terminals 40 and 42 and the electrical conductor 46 while no water is present between the terminal 44 and the electrical conductor 46, the first electrical current may flow from the terminal 40 to the electrical conductor 46 and the second electrical current may flow from the terminal 42 to the electrical conductor 46 while no current flows between the third terminal 44 and the electrical conductor 46. The intensity sensor then detects the first and second electrical currents and measures an intensity that substantially corresponds to the addition of the first and second intensities. If the measured intensity substantially corresponds to the second predefined intensity or is contained within the second predefined intensity range, then the control unit determines that the level of water is located at or above the position $P_2$ while being located below the position $P_3$.

When water is present between the three terminals 40, 42 and 44 and the electrical conductor 46, the first electrical current may flow from the terminal 40 to the electrical conductor 46, the second electrical current may flow from the terminal 42 to the electrical conductor 46, and the third electrical current may flow from the terminal 44 to the electrical conductor 46. The intensity sensor then detects the first, second and third electrical currents and measures an intensity that substantially corresponds to the addition of the first, second and third intensities. If the measured intensity substantially corresponds to the third predefined intensity or is contained within the third predefined intensity range, then the control unit determines that the level of water is located at or above the position $P_3$.

In one embodiment, the apparatus 10 may further comprise a temperature sensor 50 for monitoring the temperature of the liquid contained in the container. The temperature sensor 50 is secured to the body 12 and may be located adjacent to the bottom end 16 of the body 12.

In one embodiment, the apparatus 10 may further comprise a communication unit (not shown) such as a wireless communication unit for at least transmitting signals. The control unit is in communication with the sensor unit comprising the sensors 20, 22 and 24 to receive signals indicative of the detected level of liquid and to the temperature sensor 50, if any. The controller may then send via the communication unit a signal indicative of the detected level of liquid and a signal indicative of the measured temperature. For example, the control unit may wirelessly send a signal indicative of the detected level and/or a signal indicative of the measured temperature to a mobile user device to inform a user of an actual level and/or temperature. In an embodiment in which the electrical conductor 34 and the terminal 44 are positioned to correspond to the position of the overflow aperture of the container, the control unit may be adapted to generate and transmit an alert indicative of an overflow when it detects that water is present between the terminal 44 and the electrical conductor 46.

For example, such as an apparatus 10 may be used for an automatic bathtub provided with an electronic faucet for automatically filling water into the bathtub and an electronic drain closure device for automatically opening and closing the evacuation drain of the bathtub. In one embodiment, when an overflow is detected, i.e., when the control unit detects that water is present between the terminal 44 and the electrical conductor 46, the control unit is adapted to generate and transmit a first command signal indicative of an opening for the electronic drain closure device and/or a second command signal indicative of a closure for the electronic faucet. Upon receipt of the first command from the control unit, the electronic drain closure device opens so that water may flow through the evacuation drain. Upon receipt of the second command from the control unit, the electronic faucet closes so that water be no longer dispensed.

In one embodiment, the control unit of the apparatus 10 may be adapted to control the electronic faucet and/or the electronic drain closure system. In this case, a user may transmit a desired level of water for the bathtub and the control unit automatically controls the electronic drain control device to close the evacuation drain and the electronic faucet to opens the electronic faucet in order to fill the bathtub with water. The control unit then continuously or periodically monitors the level of water within the bathtub via the sensors 20, 22 and 24. When it detects that the desired level of water is reached, the control unit closes the electronic faucet. The control unit may then transmit an alert to the user device or triggers a visual or sound alarm.

In an embodiment in which the apparatus 10 further comprises the temperature sensor 50, the user may transmit a signal indicative of a desired temperature for the water to the control unit. In this case, the control unit is adapted to control the mixing valve connected to a source of hot water and a source of cold water to provide water having the desired temperature in addition to control the flow control valve of the electronic faucet in order to open the electronic faucet and deliver water having the desired temperature. In one embodiment, the control unit is adapted to transmit the measured temperature to the user device. In one embodiment the control unit is adapted to maintain the water contained in the bathtub to a the desired temperature. When it determines that the measured temperature no longer corresponds to the desired temperature, the control unit is adapted to open the electronic drain closure device in order to evacuate water via the evacuation drain and open the electronic faucet and control the mixing valve to add water having an adequate temperature until the measured temperature corresponds to the desired temperature. When the measured temperature corresponds to the desired temperature, the control unit closes the electronic drain closure device and the electronic faucet.

Figure 2:
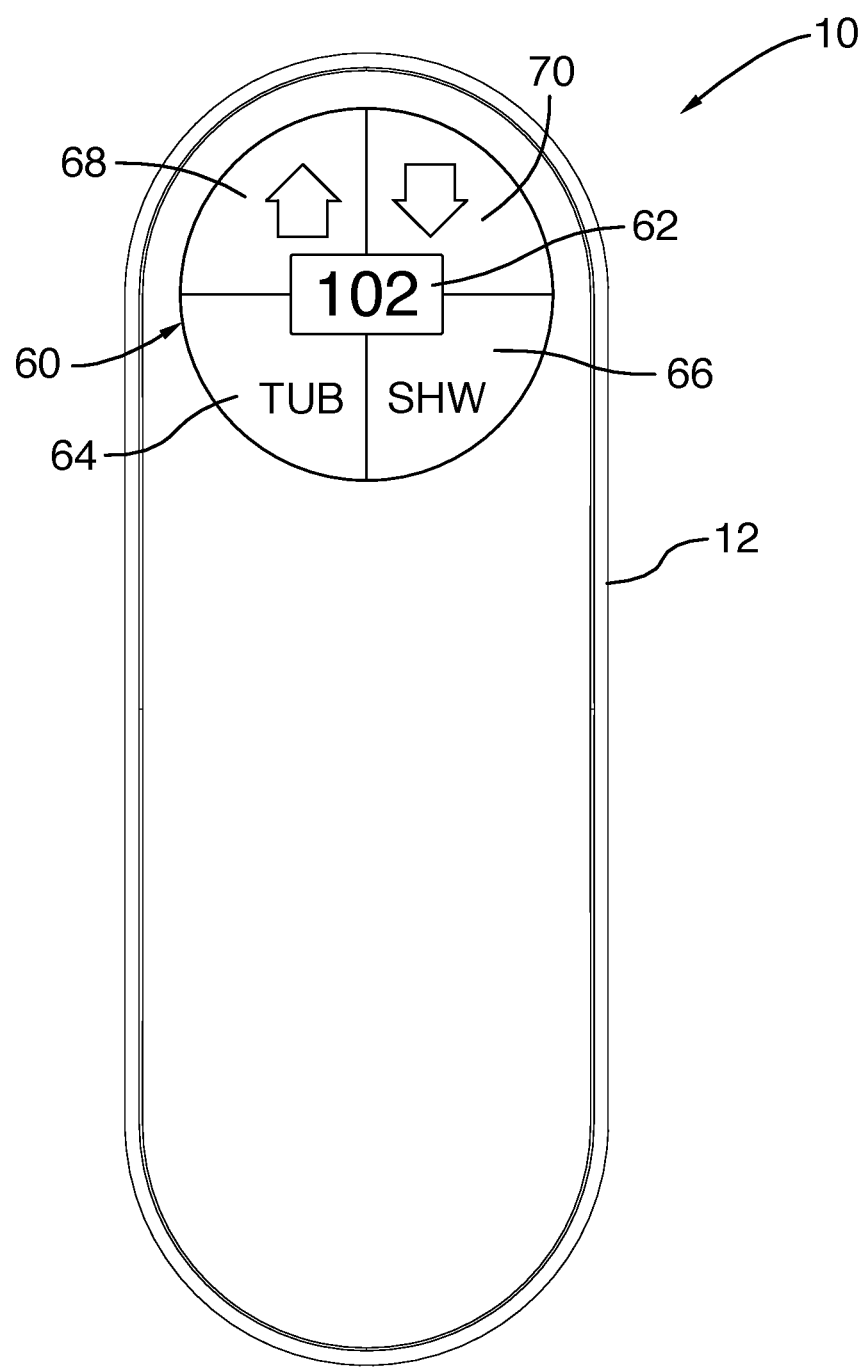
FIG. 2 is a front view of the apparatus of FIG. 1, in accordance with an embodiment.

In one embodiment, the apparatus 10 further comprises a control panel or user interface 60 which may be located on the front face of the body 12 while the level sensors 20, 22 and 24 and the temperature sensor 50, if any, are located on the rear face of the body 12, as illustrated in FIG. 2. The control panel 60 is connected to the control unit and may be used for controlling the automatic bathtub. For example, the control panel 60 may be used to automatically fill a bathtub with water. Via the control panel 60, the user may input a desired temperature for water, select a bathtub or shower mode, input a desired level of water for the bathtub, and/or the like. The control panel 60 may also be used for manually activating the electronic faucet or the shower head.

In the illustrated embodiment, the control panel 60 comprises a central display 62 for displaying information such as a desired water temperature or an actual temperature, a tub activation key 64 for activating the electronic faucet and close the electronic drain, a shower activation key 66 for activating the shower head, a first selection key 68, and a second selection key 70. For example, the first and second selection keys 68 and 70 may be used for selecting different operation modes. For example, the keys 68 and 70 may be used to select a desired level of water for the bathtub. In another example, the keys 68 and 70 may be used to input a desired temperature. I should be understood that the control panel 60 may comprise a touchscreen for allowing the user to input commands.

Figure 3:
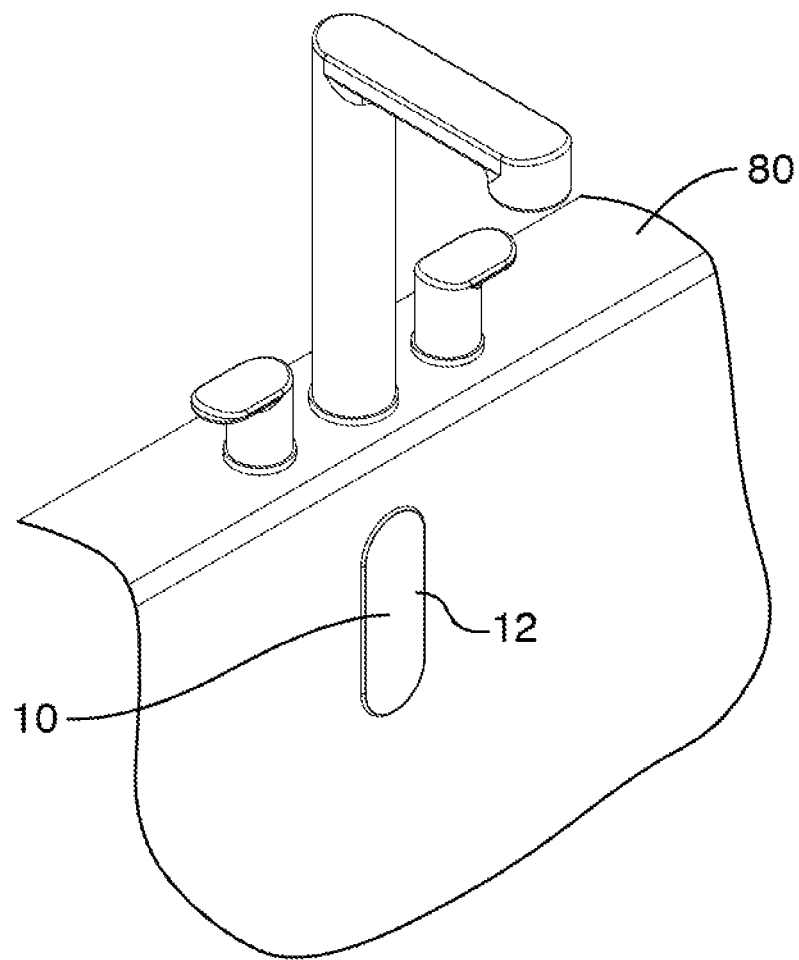
FIG. 3 illustrates an apparatus for determining the level of a liquid secured to a bathtub, in accordance with an embodiment.

FIG. 3 illustrates an exemplary apparatus 10 secured to a bathtub 80. In this embodiment, the apparatus 10 is secured over an overflow aperture (not shown) present on the wall of the bathtub 80 and connected to an overflow drain (not shown). In this case, the plate 12 of the apparatus 10 corresponds to an overflow plate and is secured to the bathtub over the overflow aperture so that a gap exists between the wall of the bathtub 80 and the rear face of the plate 12 on which the level sensors 20, 22 and 24 and the temperature sensor 50, if any, are secured. The gap allows water to flow into the overflow aperture and to be in physical contact with the sensors 20, 22, 24 and 50. It should be understood that the body 12 is secured to the wall of the bathtub 80 so that it extends along the height of the bathtub 80. In one embodiment, the overflow plate has a length along its longitudinal axis that is greater than the length of usual overflow plates.

Figure 4:
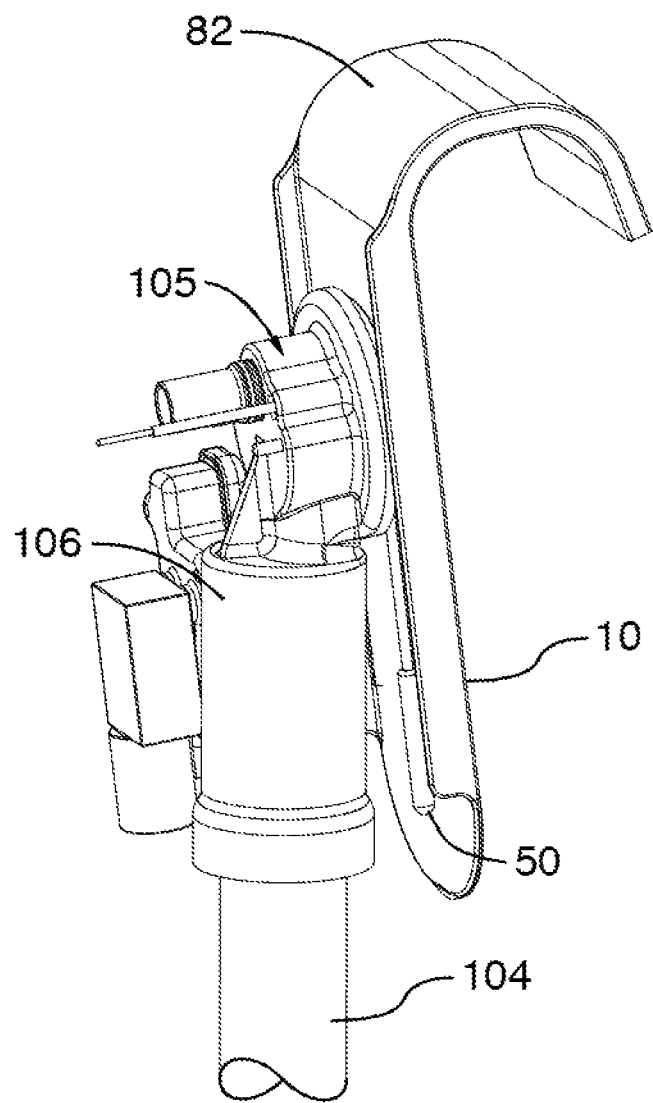
FIG. 4 illustrates an apparatus for determining the level of a liquid secured to a faucet, in accordance with an embodiment.

FIG. 4 illustrates an exemplary apparatus 10 secured to a faucet 82. The body 12 of the apparatus 10 extends downwardly from the faucet 82 and the assembly comprising the faucet 82 and the apparatus 10 is secured to the wall of a bathtub so that water way be in physical contact with the sensors 20, 22, 24 and 50 positioned on the rear face of the apparatus 10.

In an embodiment in which one of the sensor 20, 22, 24, such as the sensor 24, is positioned so as to be aligned with an overflow aperture of the container, such as at position $P_3$, the apparatus 10 may be adapted to trigger an alarm when the sensor detects water at the level of the overflow aperture. In the same or another embodiment, the apparatus 10 may be adapted to a send a signal indicative of the potential overflow. In a further embodiment, the apparatus 10 may be adapted to send a command to the electronic faucet to close the faucet and/or a command to the electronic drain to open the drain.

While in the illustrated embodiment, the apparatus 10 is securable to the bathtub, it should be understood that other embodiment may be possible. For example, the apparatus 10 may be a remote control that may be insertable into a container such as a bathtub and may float in a liquid such as water.

While in the illustrated embodiment, the control unit and the communication unit are integrated in the apparatus 10, it should be understood that other configurations may be possible. For example, the control unit and the communication unit may be independent from the body 12 while the control unit is in communication with the sensors 20, 22, 24 and 50.

Figure 5:
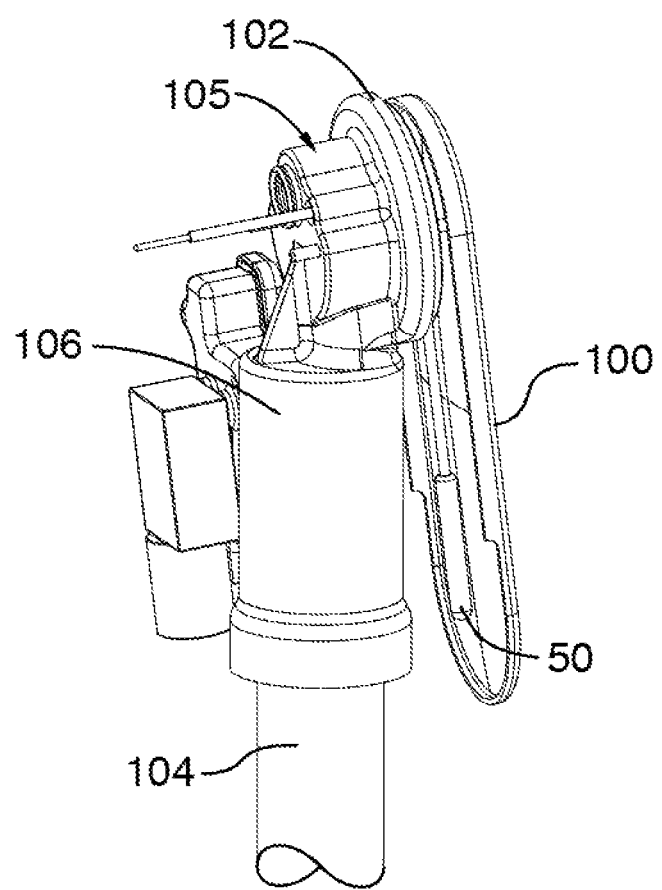
FIG. 5 is a side perspective of an apparatus for determining the level of a liquid contained in a container, the apparatus being secured to an overflow plate, in accordance with an embodiment.
Figure 6:
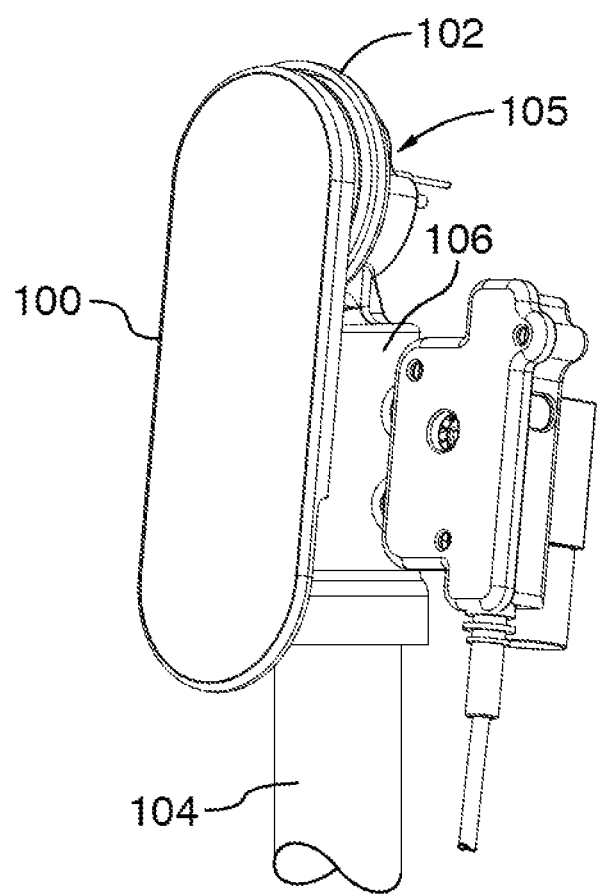
FIG. 6 is a front perspective view of the apparatus of FIG. 5 secured to the overflow plate.

FIGS. 5 and 6 illustrate an embodiment of an apparatus 100 for determining the level of liquid contained in a container that is secured to an overflow plate 102. The overflow plate 102 is fluidly connected to an overflow drain 104 via an elbow connector 105 in order to evacuate water from the container when the level of water has reached a predefined level, i.e. the overflow level.

Figure 7:
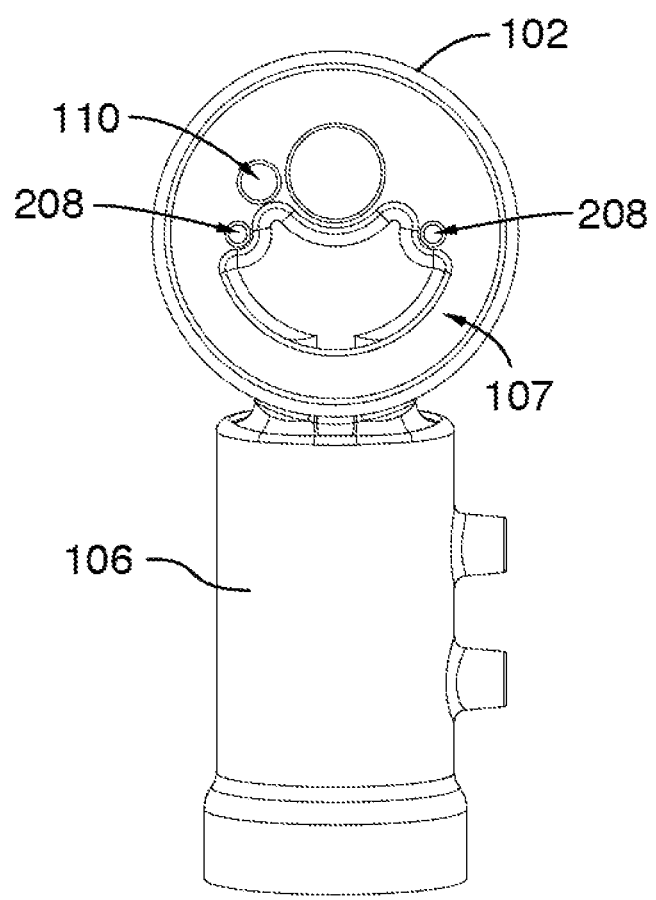
FIG. 7 is a front view of an overflow plate adapted to a have an apparatus for determining the level of a liquid contained in a container secured thereto, in accordance with an embodiment.

FIG. 7 illustrates one embodiment of the overflow plate 102 to which the apparatus 100 is secured. A chamber 106 extends from the front face of the overflow plate 102. The chamber 106 is fluidly connected to the overflow drain 104 via the elbow connector 105 in order to evacuate overflow water. The overflow plate 102 is further provided with a pair of securing holes 108 which each extend from the front face of the overflow plate 102. The securing holes 108 are sized and shaped to receive therein securing means such as screws in order to secure the apparatus 100 to the overflow plate 102.

In an embodiment, in which the control unit is independent from the body of the apparatus 100, the overflow plate 102 further comprises apertures 110. Communication cables may then be inserted through the apertures 110 to connect the sensors 20, 22, 24 and 50 mounted on the apparatus 100 to the control unit.

Figure 8:
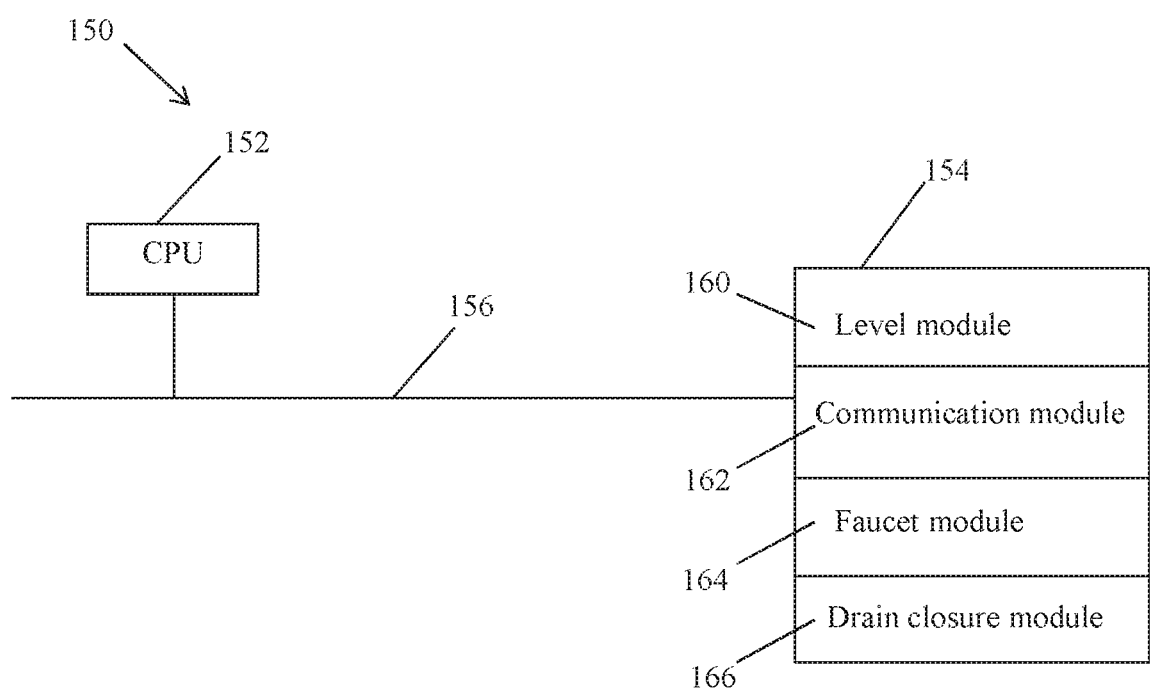
FIG. 8 is a block diagram illustrating a controller for controlling an apparatus for determining a level of liquid, in accordance with an embodiment

FIG. 8 is a block diagram illustrating an exemplary controller 150 for controlling the apparatus 10 for determining the level of liquid contained in a container, in accordance with some embodiments. The processing module 150 typically includes one or more Computer Processing Units (CPUs) or Graphic Processing Units (GPUs) 152 for executing modules or programs and/or instructions stored in memory 154 and thereby performing processing operations, memory 154, and one or more communication buses 156 for interconnecting these components. The communication buses 156 optionally include circuitry (sometimes called a chipset) that interconnects and controls communications between system components. The memory 154 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 154 optionally includes one or more storage devices remotely located from the CPU(s) 152. The memory 154, or alternately the non-volatile memory device(s) within the memory 154, comprises a non-transitory computer readable storage medium. In some embodiments, the memory 154, or the computer readable storage medium of the memory 154 stores the following programs, modules, and data structures, or a subset thereof:
  a level module 160 for determining the level of water using the measured intensity of the detected current;
  a communication module 162 for generating alerts, alarms, command signals and/or signals indicative of measured data;

a faucet module 164 for controlling the electronic faucet; and a drain closure module 166 for controlling the electronic drain closure device.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, the memory 154 may store a subset of the modules and data structures identified above. Furthermore, the memory 154 may store additional modules and data structures not described above.

Although FIG. 8 shows a processing module 150, FIG. 8 is intended more as functional description of the various features which may be present in a management module than as a structural schematic of the embodiments described herein. In practice, and as recognized by those of ordinary skill in the art, items shown separately could be combined and some items could be separated.

It should be understood that the control unit, the memory and the communication unit may be inserted into the casing 12.

While the above-described sensing unit comprises three input electrical conductors 30, 32 and 34 and a single output electrical conductor 46, it should be understood that other configurations may be possible. For example, the sensing unit may comprise the three input electrical conductors 30, 32 and 34 and three output electrical conductors each associated with a respective input electrical conductors 30, 32, 34 so that the terminal of each output electrical conductor faces the terminal 40, 42, 44 of its respective input electrical conductors 30, 32, 34. In this case, the sensing unit further comprises three current sensor each connected to a respective input electrical conductors 30, 32, 34 and its associated output electrical conductor to measure the respective current flowing therethrough. In this case, a current is injected in each input electrical conductor 30, 32, 34 and when water is present between the terminal 40, 42, 44 and the terminal of its respective output electrical conductor, the current may flow from the input electrical conductors 30, 32, 34 to its respective output electrical conductor. For example, if water is present only between the terminal 40 and the terminal of its respective output electrical conductor, the current sensor associated with the input electrical conductor 30 detects a current while the other two current sensors associated with the input electrical conductors 32 and 34 detects not current. In this case, the control unit compares the intensity measured by the current sensor associated with the input electrical conductor 30 to a predefined intensity or a predefined intensity range and if the comparison is positive, the control unit determines that the level of liquid is at or above the position $P_1$ while being below the position $P_2$.

The embodiments of the invention described above are intended to be exemplary only. The scope of the invention is therefore intended to be limited solely by the scope of the appended claims.

We claim:

1. An overflow system for a fluid container having a wall and an overflow aperture defined in the wall, the overflow system comprising:

a body securable to the wall of the container, over the overflow aperture, the body extending along a longitudinal axis and having a front face and a rear face, the rear face of the body being spaced-apart from the wall of the container to allow fluid communication between the container and the overflow aperture;

a level sensor unit secured to the rear face of the body, the level sensor unit being configured for detecting the level of the liquid along the longitudinal axis of the body, wherein the level sensor unit includes at least one current source, an electrical circuit, and at least one current sensor for measuring at least one current intensity; and a control unit comprising a database including a predefined intensity or a predefined intensity range, wherein the control unit is operatively connected to the level sensor unit for determining a level of liquid, and wherein the control unit is configured to compare the at least one current intensity to the predefined intensity or the predefined intensity range and determine the level of liquid based on the comparison.

2. The overflow system of claim 1, wherein the level sensor unit comprises at least one liquid sensor each positioned at a respective position along the longitudinal axis, each respective position corresponding to a different level of liquid and each liquid sensor configured to detect a presence of the liquid.

3. The overflow system of claim 2, wherein the electrical circuit comprises at least one input electrical conductor and at least one output electrical conductor, each input electrical conductor being inserted into the body, having a first terminal connected to the at least one current source and a second terminal emerging from the body at one of the respective positions along the longitudinal axis, at least one section of the output electrical conductor emerging from the body adjacent to the second terminal of a respective one of the at least one input electrical conductor.

4. The overflow system of claim 3, wherein each second terminal and at least one output electrical conductor form together a respective electrical switch that is open when no liquid is present between the second terminal and the at least one output electrical conductor and that is closed when liquid is present between the second terminal and the at least one output electrical conductor.

5. The overflow system of claim 4, wherein the at least one output electrical conductor comprises a single electrical conductor and the at least one current sensor comprises a single current sensor.

6. The overflow system of claim 1, further comprising a communication unit connected to the control unit.

7. The overflow system of claim 6, wherein the communication unit is a wireless communication unit.

8. The overflow system of claim 6, wherein the control unit is adapted to transmit a signal indicative of the determined level of liquid via the communication unit.

9. The overflow system of claim 6, wherein the database includes a reference level of liquid, and wherein the control unit is adapted to trigger one of an alert or an alarm upon determining that the determined level of liquid corresponds to the reference level of liquid.

10. The overflow system of claim 9, wherein the reference level of liquid corresponds to an overflow level of liquid.

11. The overflow system of claim 10, wherein the control unit is further connected to at least one of an electronic faucet or an electronic drain closure system.

12. The overflow system of claim 11, wherein, upon determining that the determined level of liquid corresponds to the overflow level of liquid, the control unit is adapted to generate and transmit at least one of a first command indicative of a closure for the electronic faucet and a second command indicative of an opening for the electronic drain closure system.

13. The overflow system of claim 1, further comprising a temperature sensor for measuring a temperature of the liquid, the temperature sensor being secured to the rear face of the body, the control unit further being operatively coupled to the temperature sensor.

14. The overflow system of claim 13, wherein the control unit is configured to compare the temperature measured by the temperature sensor to a predetermined temperature.

15. The overflow system of claim 14, wherein the control unit is further connected to at least one of an electronic faucet or a drain closure system, and when the control unit determines that the temperature measured by the temperature sensor does not correspond to the predetermined temperature, the control unit is adapted to generate and transmit at least one of a first command indicative of an opening for an electronic faucet or a second command indicative of an opening for an electronic drain closure system.

16. The overflow system of claim 1, wherein the body is further securable to a faucet.

17. The overflow system of claim 1, wherein the container is a bathtub.

18. The overflow system of claim 1, further comprising a control panel for controlling at least one user parameter of the container, the control panel being mounted to the front face of the body and operatively coupled to the control unit.

19. The overflow system of claim 18, wherein the at least one user parameter of the container is selected from a group consisting of an automatic filling of the container with the liquid, a desired temperature for the liquid, a selection of a bathtub mode, a selection of a shower mode, a desired level of liquid in the container, a manual activation of an electronic faucet and a manual activation of a shower head.

20. The overflow system of claim 18, wherein the control panel comprises a touchscreen.

* * * * *